Feb. 16, 1937.   J. R. VANEK   2,070,979

NONSPILLABLE STORAGE BATTERY

Filed March 29, 1935

Inventor
Joseph R. Vanek.
John J. Thompson
Attorney

Patented Feb. 16, 1937

2,070,979

UNITED STATES PATENT OFFICE 2,070,979

NONSPILLABLE STORAGE BATTERY

Joseph R. Vanek, Poughkeepsie, N. Y.

Application March 29, 1935, Serial No. 13,677

1 Claim. (Cl. 136—177)

This invention relates primarily to an electric storage battery for automobiles, aeroplanes and other vehicles in which a storage battery containing a liquid electrolyte is employed, and the invention relates more particularly to a novel means or construction of the battery casing whereby a non-spillable battery is provided.

It is a well known fact that in the case of accidents to vehicles where the vehicle is turned on its side or upside down, the liquid electrolyte from the battery will escape through the vent holes in the filler caps, and will destroy everything that it comes into contact with, such as the upholstery of the vehicle or the clothing of the occupant, thus creating great damage to the vehicle and possible burns to the occupants.

In the case of storage batteries for use in aeroplanes, where the plane is in various positions, it has been the practice to provide an outer cover for the top of the battery to cover the vent caps, terminals, etc., but the space between this cover and the top of the battery becomes filled with the electrolyte, fumes and condensation, which will in time leak out and which will also tend to cause corrosion of the metal parts.

The objects of the invention are to provide a non-spillable storage battery in which while ample provision is made for the escape of the fumes or gases, no appreciable amount of the liquid electrolyte or solution from the cells of the battery can escape from the case in most of the positions that the case may be placed.

Another object of the invention is to provide a battery of this class which shall be cheap to manufacture, contain few parts and require no expensive changes from the present design of storage battery.

Another object of the invention is to provide means whereby batteries now in use may without great cost be provided with my invention, and without requiring any special form of cover.

Another object of the invention is to provide means whereby the vents are placed upon the side of the battery in place of on the bottom, to prevent any direct discharge of the fumes or liquid against the metal parts of the battery support, or the vent holes becoming clogged due to the casing rubbing against the supporting frame.

With these and other objects in view, my invention consists in certain novel construction and combination of parts as will hereinafter be fully described and claimed, and further illustrated in the accompanying drawing, in which like figures of reference refer to corresponding parts in all of the views, and it is understood that slight changes may be made without departing from the spirit of the invention.

Figure 4:
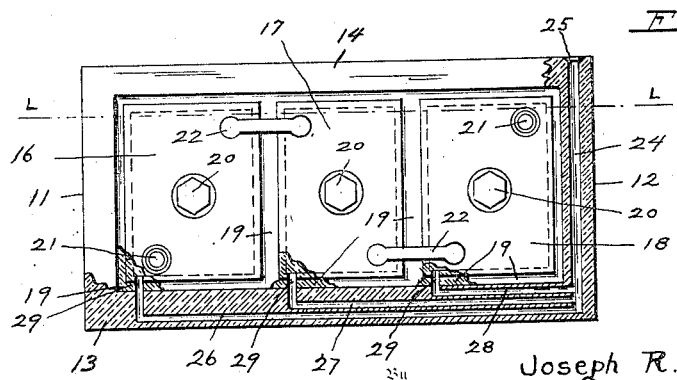

Figure 4 shows the same battery partly in section and resting upon its side, the section being taken on a plane with the tubes 26, 27 and 28, and also on a plane with the tube 24.

Referring to the drawing:

I have here indicated the usual electric storage battery which is composed of molded material such as rubber and having the casing formed of the ends 11 and 12; the bottom 10 and the sides 13 and 14 all integral.

This casing is divided by the partitions 15 into several cells or compartments, each of which is provided with a cover 16, 17 and 18 which is cemented in place by the compound 19; these covers being provided with the filler caps 20; the terminals 22 and 21 extending therethrough in the usual manner. The interior of the battery, plates, etc., not being shown, as this has no bearing on the invention.

Within one end 11 of the casing is molded or otherwise provided a tubular vent duct 23 which extends to within a short distance of the top and the bottom 10, and which is vertical or parallel to the casing sides.

To the bottom of this vent duct 23 is attached one end of a transverse discharge vent duct 24 which is also molded or otherwise formed in the bottom 10 and which is inclined at an angle to the bottom 10, and terminated in a discharge flared opening 25 in the side 14 of the casing near the bottom 10.

The upper end of the vertical vent duct 23 is connected to the ends of three vent ducts 26, 27 and 28, which are formed in the upper part of the side wall 13 and which are inclined at an angle with respect to the top, so that there is a natural drainage from the vent ducts 26, 27 and 28 to the discharge opening 25.

These vent ducts 26, 27 and 28 are of different lengths and have their ends connected by the ducts 29 through the walls of the covers 16, 17 and 18 above the level of the electrolyte in the cells, which is indicated by the broken lines L—L on the figures.

The capacity of the vent ducts 23 and 24 should be three times that of one of the tubes or ducts 26, 27 and 28, or if desired in place of the three vent ducts 26, 27 and 28, only one vent duct may be used, and connected at the proper locations with the covers 16, 17 and 18; and also if a single vent duct is employed, this may be tapered from end to end to take care of the volume passing therethrough from the cells.

It is also understood that as many cells may be used as desired, and any desired size and shape of battery casing, and that the vent ducts may be molded therein, or be in the form of tubes attached thereto.

Figure 1:
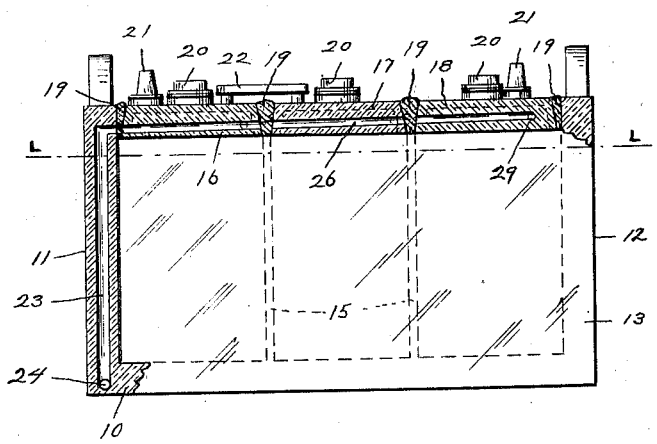
Figure 1 is a side elevation partly in section of a storage battery embodying my invention.

By an inspection of the views of the drawing, it will be seen that in Figure 1, the fumes, etc. from the electrolyte will escape through the tubes 29 into and through the vents 23 and 24, and that no liquid can escape through these ducts, the discharge opening 25 being at or near the bottom of the casing.

Figures 2, 3:
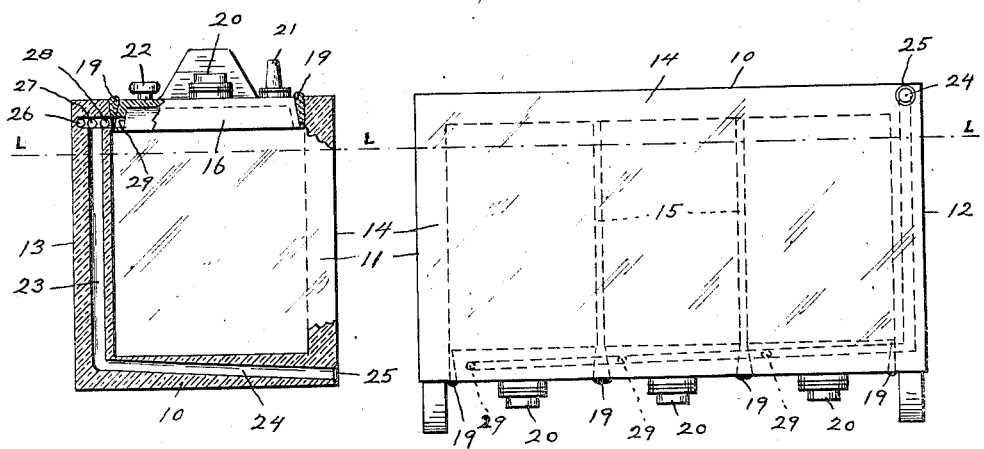
Figure 2 is an end elevation of the same, partly in section.
Figure 3 shows the same battery in an inverted position.

Should the battery be upside down as indicated in Figure 3, the discharge opening 25 is above the liquid level and so no liquid can escape.

On its side as in Figure 4, the discharge opening 25 is on top and so above the liquid level.

Should it be on either end; that is on the end 11, the discharge opening 25 is still near the top and above the liquid level; while if on the end 12, the liquid level in each of the cells is below the duct 29, so that no liquid can enter any of the ducts.

It has been found from actual tests that no liquid will escape in any position that the battery may be placed as the vent caps are air tight a vacuum is created in the ducts which will prevent the escape of any liquid until air is admitted upon unscrewing the caps.

Having thus described my invention, what I claim as new and desire to secure by Letters Patent, is:

A storage battery comprising a casing divided into cells having covers, one end wall of the casing having a vertical vent duct therein and disposed adjacent one corner of the casing, the bottom of the casing having a transversely disposed vent duct therein alined with one end wall of the casing and having its outer end opening at one side of the casing and its inner end in communication with the lower end of the vertical duct, one side wall of the casing having a plurality of longitudinally extending vent ducts formed therein adjacent its upper edge, each having its inner end in communication with a cell, the outer ends thereof discharging into the rear end of said vertical vent duct.

JOSEPH R. VANEK.